(12) United States Patent
Yang et al.

(10) Patent No.: US 11,025,719 B2
(45) Date of Patent: Jun. 1, 2021

(54) DECLARATIVE MACHINE-TO-MACHINE APPLICATION PROGRAMMING

(71) Applicant: Intel Corporation, Santa Clara, CA (US)

(72) Inventors: Shao-Wen Yang, San Jose, CA (US); Yen-Kuang Chen, Palo Alto, CA (US); Nyuk Kin Koo, Bukit Merkajam (MY)

(73) Assignee: Intel Corporation, Santa Clara, CA (US)

( * ) Notice: Subject to any disclaimer, the term of this patent is extended or adjusted under 35 U.S.C. 154(b) by 91 days.

(21) Appl. No.: 16/062,040

(22) PCT Filed: Dec. 20, 2015

(86) PCT No.: PCT/US2015/066958
§ 371 (c)(1),
(2) Date: Jun. 13, 2018

(87) PCT Pub. No.: WO2017/111880
PCT Pub. Date: Jun. 29, 2017

(65) Prior Publication Data
US 2019/0028545 A1    Jan. 24, 2019

(51) Int. Cl.
*H04L 29/08* (2006.01)
*H04W 4/70* (2018.01)
*H04L 29/02* (2006.01)
*H04W 4/00* (2018.01)

(52) U.S. Cl.
CPC .............. *H04L 67/12* (2013.01); *H04L 29/02* (2013.01); *H04L 67/04* (2013.01); *H04W 4/00* (2013.01); *H04W 4/70* (2018.02)

(58) Field of Classification Search
CPC ......... H04L 67/12; H04L 29/02; H04L 67/04; H04W 4/70; H04W 4/00
USPC ....................................................... 709/223
See application file for complete search history.

(56) References Cited

U.S. PATENT DOCUMENTS

| | | | |
|---|---|---|---|
| 6,735,630 B1 | 5/2004 | Gelvin et al. | |
| 9,009,147 B2 * | 4/2015 | He ...................... | G06F 16/9024 707/728 |
| 2008/0320056 A1 * | 12/2008 | Mohanan ................ | G06F 21/16 |
| 2009/0235213 A1 * | 9/2009 | Hao ..................... | G06F 17/5081 716/136 |

(Continued)

OTHER PUBLICATIONS

International Preliminary Report on Patentability in International Application No. PCT/US2015/066958, dated Jun. 26, 2018, 7 pages.

(Continued)

*Primary Examiner* — Joseph L Greene
(74) *Attorney, Agent, or Firm* — Alliance IP, LLC

(57) ABSTRACT

Multiple devices are detected in an environment and a user input is received to define a relationship between two or more devices in the plurality of devices. A system can determine that a first of the two or more devices includes a sensor resource and a second of the two or more devices includes an actuator resource. Data is identified describing outputs of the first device corresponding to the sensor resource and inputs of the second device corresponding to the actuator resource. A model is generated modeling interoperation of the sensor resource and actuator resource based at least in part on the data.

20 Claims, 12 Drawing Sheets

(56) References Cited

U.S. PATENT DOCUMENTS

| | | |
|---|---|---|
| 2010/0153458 A1 | 6/2010 | Angell et al. |
| 2013/0325756 A1* | 12/2013 | He .................... G06K 9/628 |
| | | 706/12 |
| 2013/0336316 A1 | 12/2013 | Sudhaakar et al. |
| 2015/0022374 A1 | 1/2015 | Kim et al. |
| 2015/0089061 A1* | 3/2015 | Li ........................ H04W 4/70 |
| | | 709/226 |
| 2015/0163289 A1 | 6/2015 | Paul et al. |
| 2016/0135241 A1* | 5/2016 | Gujral .................. H04W 4/70 |
| | | 370/328 |
| 2016/0277532 A1* | 9/2016 | Lee ...................... H04L 67/322 |
| 2018/0205793 A1* | 7/2018 | Loeb .................... H04W 4/70 |

OTHER PUBLICATIONS

International Search Report and Written Opinion in International Application No. PCT/US2015/066958, dated Sep. 8, 2016, 10 pages.

EPO; Extended European Search Report issued in EP Patent Application No. 15911576.5, dated Jul. 8, 2019; 5 pages.

Patel, Pankesh; "Enabling High-Level Application Development for the Internet of Things," HAL Archives-ouvertes.fr; https://tel.archives-ouvertes.fr/tel-00927150; submitted Jan. 11, 2014; 122 pages.

* cited by examiner ial Application Serial No. PCT/US2015/066958, filed on Dec. 20, 2015, and entitled DECLARATIVE MACHINE-TO-MACHINE APPLICATION PROGRAMMING. The disclosure of the prior application is considered part of and is hereby incorporated by reference in its entirety in the disclosure of this application.

TECHNICAL FIELD

This disclosure relates in general to the field of computer systems and, more particularly, to programming Internet of Things application programming.

BACKGROUND

The Internet has enabled interconnection of different computer networks all over the world. While previously, Internet-connectivity was limited to conventional general purpose computing systems, ever increasing numbers and types of products are being redesigned to accommodate connectivity with other devices over computer networks, including the Internet. For example, smart phones, tablet computers, wearables, and other mobile computing devices have become very popular, even supplanting larger, more traditional general purpose computing devices, such as traditional desktop computers in recent years. Increasingly, tasks traditionally performed on a general purpose computers are performed using mobile computing devices with smaller form factors and more constrained features sets and operating systems. Further, traditional appliances and devices are becoming "smarter" as they are ubiquitous and equipped with functionality to connect to or consume content from the Internet. For instance, devices, such as televisions, gaming systems, household appliances, thermostats, automobiles, watches, have been outfitted with network adapters to allow the devices to connect with the Internet (or another device) either directly or through a connection with another computer connected to the network. Additionally, this increasing universe of interconnected devices has also facilitated an increase in computer-controlled sensors that are likewise interconnected and collecting new and large sets of data. The interconnection of an increasingly large number of devices, or "things," is believed to foreshadow a new era of advanced automation and interconnectivity, referred to, sometimes, as the Internet of Things (IoT).

BRIEF DESCRIPTION OF THE DRAWINGS

Like reference numbers and designations in the various drawings indicate like elements.

DETAILED DESCRIPTION OF EXAMPLE EMBODIMENTS

Figure 1:
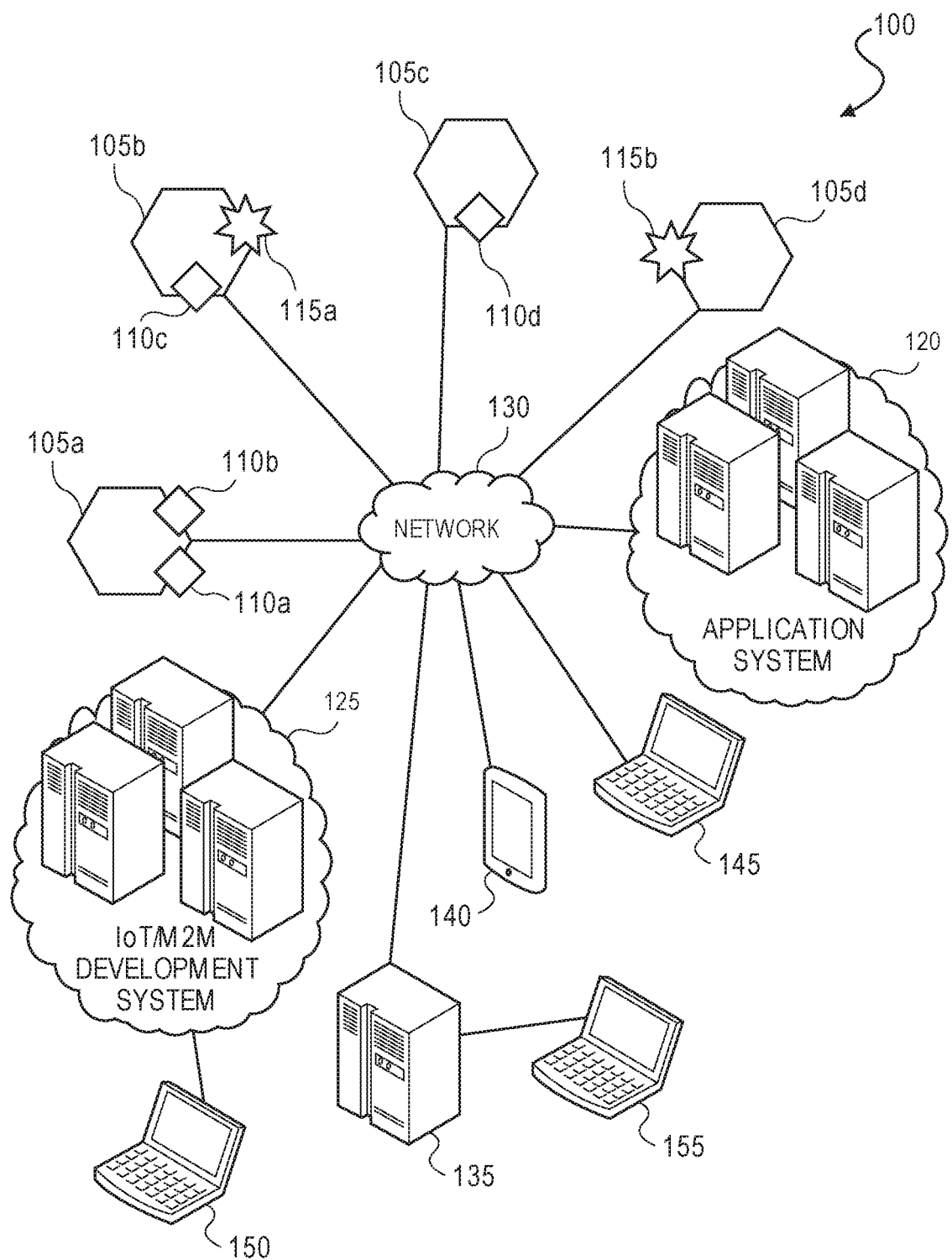
FIG. 1 illustrates an embodiment of a system including multiple devices and an example development automation system.

FIG. 1 is a block diagram illustrating a simplified representation of a system 100 that includes one or more smart devices 105a-d deployed throughout an environment. Each device 105a-d may include one or more resources by which the device interacts with its environment. For instance, the device may include one or more sensors (e.g., 110a-d) capable of detecting, measuring, and generating sensor data describing characteristics of the environment in which it resides, is mounted, or is in contact with. For instance, a given sensor (e.g., 110a-d) may be configured to detect one or more respective characteristics such as movement, weight, physical contact, temperature, wind, noise, light, computer communications, wireless signals, position, humidity, the presence of radiation, liquid, or specific chemical compounds, among several other examples. Indeed, sensors (e.g., 110a-d) as described herein, anticipate the development of a potentially limitless universe of various sensors, each designed to and capable of detecting, and generating corresponding sensor data for, new and known environmental characteristics. Other resources can allow the device to perform some kind of action to affect its environment. For instance, one or more of the devices (e.g., 105b, 105d) may include an actuator resource (e.g., 115a-b) that accepts an input and perform its respective action in response. Actuators can include controllers to activate additional functionality, such as an actuator to selectively toggle the power or operation of an alarm, camera (or other sensors), heating, ventilation, and air conditioning (HVAC) appliance, household appliance, in-vehicle device, lighting, door lock, among other examples.

In some implementations, sensors 110a-d and actuators 115a-b provided on devices 105a-d can be incorporated in and/or embody an Internet of Things (IoT) or machine-to-machine (M2M) system. IoT systems can refer to new or improved ad-hoc systems and networks composed of multiple different devices interoperating and synergizing to deliver one or more results or deliverables. Such ad-hoc systems are emerging as more and more products and equipment evolve to become "smart" in that they are controlled or monitored by computing processors and provided with facilities to communicate, through computer-implemented mechanisms, with other computing devices (and products having network communication capabilities). For instance, IoT systems can include networks built from sensors and communication modules integrated in or attached to "things" such as equipment, toys, tools, vehicles, etc. and even living things (e.g., plants, animals, humans, etc.). In some instances, an IoT system can develop organically or unexpectedly, with a collection of sensors monitoring a variety of things and related environments and interconnecting with data analytics systems and/or systems controlling one or more other smart devices to enable various use cases and application, including previously unknown use cases. Further, IoT systems can be formed from devices that hitherto had no contact with each other, with the system being composed and automatically configured spontaneously or on the fly (e.g., in accordance with an IoT application defining or controlling the interactions). Further, IoT systems can often be composed of a complex and diverse collection of connected devices (e.g., 105a-d), such as devices sourced or controlled by varied groups of entities and employing varied hardware, operating systems, software applications, and technologies.

Facilitating the successful interoperability of such diverse systems is, among other example considerations, an important issue when building or defining an IoT system. Software applications can be developed to govern how a collection of IoT devices can interact to achieve a particular goal or service. In some cases, the IoT devices may not have been originally built or intended to participate in such a service or in cooperation with one or more other types of IoT devices. Indeed, part of the promise of the Internet of Things is that innovators in many fields will dream up new applications involving diverse groupings of the IoT devices as such devices become more commonplace and new "smart" or "connected" devices emerge. However, the act of programming, or coding, such IoT applications may be unfamiliar to many of these potential innovators, thereby limiting the ability of these new applications to be developed and come to market, among other examples and issues.

As shown in the example of FIG. 1, multiple IoT devices (e.g., 105a-d) can be provided. An IoT device can be any apparatus that includes one or more sensors (e.g., 110a-d). For instance, a device (e.g., 105a-d) can include such examples as a mobile personal computing device, such as a smart phone or tablet device, a wearable computing device (e.g., a smart watch, smart garment, smart glasses, smart helmet, headset, etc.), purpose-built devices such as and less conventional computer-enhanced products such as home, building, vehicle automation devices (e.g., smart heat-ventilation-air-conditioning (HVAC) controllers and sensors, light detection and controls, energy management tools, etc.), smart appliances (e.g., smart televisions, smart refrigerators, etc.), and other examples. Some devices can be purpose-built to host sensor and/or actuator resources, such as a weather sensor devices that include multiple sensors related to weather monitoring (e.g., temperature, wind, humidity sensors, etc.), traffic sensors and controllers, among many other examples. Some devices may be statically located, such as a device mounted within a building, on a lamppost, sign, water tower, secured to a floor (e.g., indoor or outdoor), or other fixed or static structure. Other devices may be mobile, such as a sensor provisioned in the interior or exterior of a vehicle, in-package sensors (e.g., for tracking cargo), wearable devices worn by active human or animal users, an aerial, ground-based, or underwater drone among other examples. Indeed, it may be desired that some sensors move within an environment and applications can be built around use cases involving a moving subject or changing environment using such devices, including use cases involving both moving and static devices, among other examples.

Continuing with the example of FIG. 1, in some implementations, one or more systems can control, monitor, and/or consume sensor data generated by a collection of sensor devices (e.g., 105a-d). For instance, an application system (e.g., 120) can serve an application or service that makes use of and coordinate the interoperation of devices (e.g., 105a-d). For instance, an application system 120 can receive data generated by one or more sensors (e.g., 110a-d) on one or more devices (e.g., 105a-c) and provide data to one or more actuators (e.g., 115a-b) on one or more devices (e.g., 105b,d) to achieve a result. In some cases, the application can pre-process data received by sensors (e.g., 110a-d) in the system before and provide inputs to the actuators (e.g., 115a-b) generated from the algorithms and functions used to pre-process the sensor data. While the example of FIG. 1 illustrates a remote application system (e.g., 120) hosting the software- and/or hardware-based logic implementing the application, in some instances, at least a portion of the logic can be hosted on one of the very devices (e.g., 105a-d) hosting one or more of the sensor(s) and/or actuator (s) utilized in the application, among other example implementations.

IoT applications can be used to organize a collection of sensor devices to provide additional utility and insights through analysis of the data set. Such services might include (among potentially limitless alternative examples) air quality analysis based on multiple data points describing air quality characteristics, building security based on multiple data points relating to security, personal health based on multiple data points describing health characteristics of a single or group of human user(s), traffic analysis, and so on. IoT applications and their logic can also be utilized to facilitate and define data transfer between different devices in connection with the purposes and services of the IoT application.

An IoT/M2M development system 125 can be provided in some implementations to facilitate the development and programming of IoT/M2M applications, such as described above. In one implementation, the development system 125 can provide development tools to facilitate declarative programming. In one example, using declarative IoT application programming, a user can identify a set of IoT devices and define general relationships between the IoT devices, from which the development system can automatically generate the functions and logic allowing intercommunication and interoperation between the devices. Accordingly, a full IoT application can be generated utilizing declarative programming principles, allowing users to develop new IoT applications without more formal programming expertise.

One or more networks (e.g., 130) can facilitate communication between devices (e.g., 105a-d) and systems (e.g., 120, 125, 135), including local networks, public networks, wide area networks, broadband cellular networks, the Internet, and the like. Additionally, computing environment 100 can include one or more user devices (e.g., 140, 145, 150, 155, etc.) that can allow users to access and interact with one or more of the applications, data, and/or services hosted by one or more systems (e.g., 120, 125, 135) over a network 130, or at least partially local to the user devices (e.g., 150, 155), among other examples. For instance, one or more graphical user interfaces (GUIs) can be provided in connection with declarative programming tools of the development system 125 allowing users to intuitively define custom IoT systems and cause the development system 120 to automatically generate corresponding IoT application code to implement a corresponding IoT application, among other examples.

In general, "servers," "clients," "computing devices," "network elements," "hosts," "system-type system entities," "user devices," "sensor devices," and "systems" (e.g., 105a-d, 120, 125, 135, 140, 145, 150, 155, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

In one implementation, programming of IoT application and system can be made more accessible to novice and expert programmers by using declarative programming rather the conventional imperative means. Specifically, declarative programming, which hides the details from the users, in effect, can make IOT programming easy as users do not need to know the underlying technical details (e.g., condition/branching within the logic, data transfer mechanisms, etc.) and expand the expressiveness of an IoT system's administrative/management tool (e.g., as implemented through a corresponding IoT application) as complicated operators can be very difficult for users to use graphically. Such "overly technical" details can be hidden from the user through application development tools and system management interfacing implementing declarative programming principles. A novel end-to-end system with unique management interface design is described herein that uses a declarative programming paradigm to hide operators and functions facilitating the interoperation of devices. In some cases, supervised machine learning can be applied by the application development system to automatically learn any operators facilitating machine-to-machine interoperation and automatically develop IoT application logic for the system.

In many modern development systems, the provided programming tools are complicated and have high barriers to entry, especially to people without a formal or professional engineering background. It is the "imperative" nature of these tools that often limits their usefulness. Declarative thinking in psychological terms is that there is no logical order to the thoughts, the thoughts are free flowing and spontaneous. "Declarative" implies the "what" a system is to do rather than "how" it actually does it. Declarative means referentially transparent and relational. Declarative languages tend to fade into the background of programming, in part because they are closer to how humans naturally interact with people. For example, if a person is talking with a friend and wants a sandwich, the person typically does not give the friend step-by-step instructions on how to make the sandwich. Doing so would be like programming the friend—instead the person simply asks the friend to make a certain type of sandwich and expects the friend to make one accordingly.

In a declarative paradigm, a user can program an IOT system by saying what they intend the system for be. For instance, if one wants to enable smart lighting control based on room occupancy, a user could just "declare" the relationship between light switch and occupancy sensor rather than specifically define the logical order (or dataflow), i.e., step-by-step instructions that are to enable an occupancy sensor's output to be read by and acted upon by the light switch, among other examples. In a sense, imperative programming can be regarded as directional and functional, while declarative programming is undirected and typically relational. Traditional IoT programming tools are typically imperative tools and potentially limit the promise of IoT systems. For instance, the imperative nature of traditional programming tools can limit the expressiveness of a language (tradeoff between usability and expressiveness), and such tools often require a level of formal programming expertise, among other example issues. In one instance, an improved IoT programming, or development, environment can utilize declarative programming to allow users to specify the relationships among capabilities and allows the underlying development system intelligence to automatically determine the users' intention for the system from the declaration and generate at least a portion of the logic for use in managing a desired interoperation between the related devices.

Figure 2:
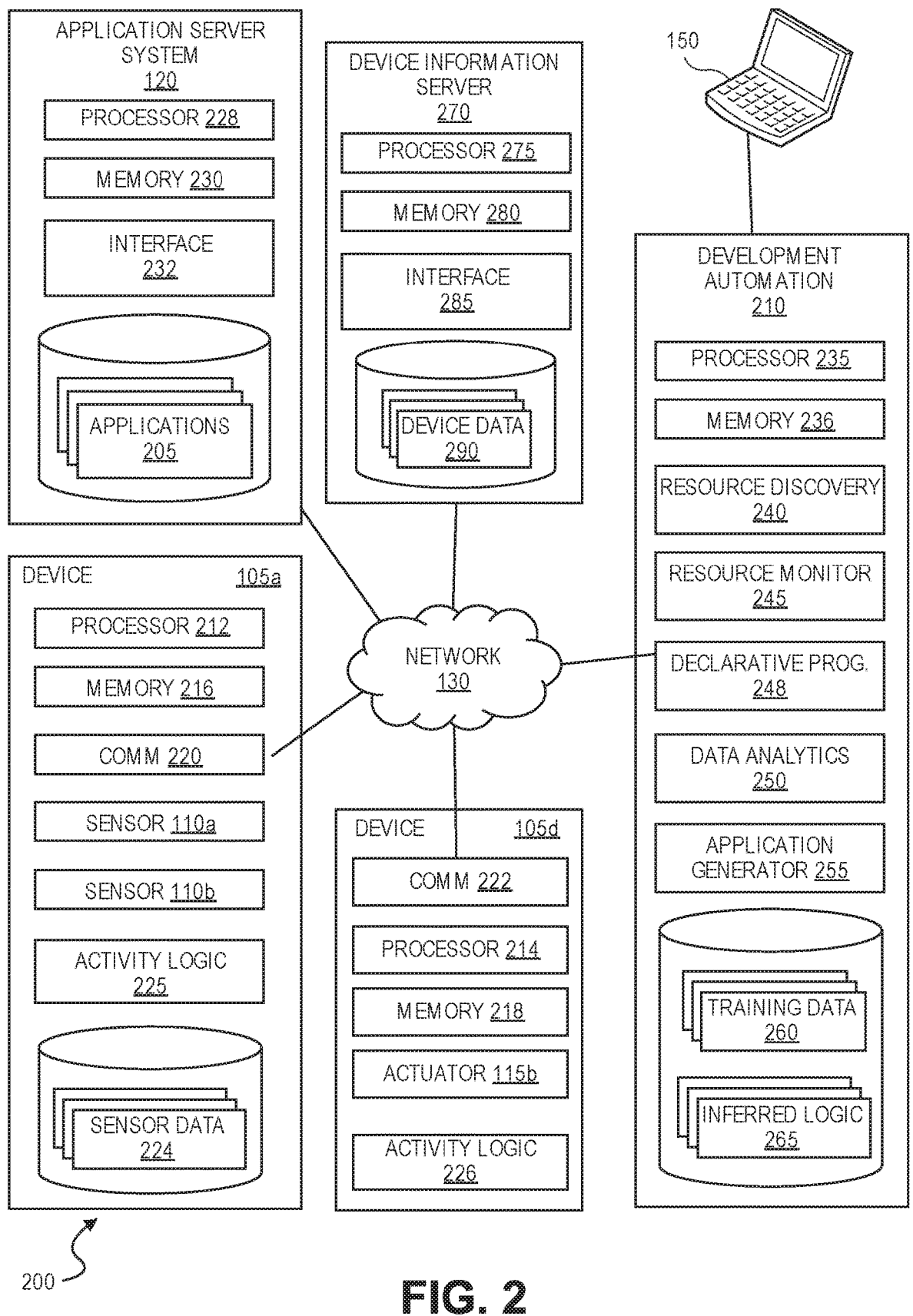
FIG. 2 illustrates an embodiment of a system including a development automation system.

Systems, such as those shown and illustrated herein, can include machine logic implemented in hardware and/or software to implement the solutions introduced herein and address at least some of the example issues above (among others). For instance, FIG. 2 shows a simplified block diagram 200 illustrating a system including multiple sensor devices (e.g., 105*a,d*) communicating wirelessly over a network 130. In some implementations, an application server 120 can host one or more IoT applications (e.g., 205) programmed to support various outcomes utilizing set of devices (e.g., 105*a,d*). Each application 205 can support operations utilized to facilitate the outcome as well as interoperation and-communication of the devices (e.g., 105*a,d*). Further, a development automation engine 210 can be provided to enable the automated generation of at least a portion of the IoT applications (e.g., 205) utilizing declarative programming principles.

In one example, each device (e.g., 105*a,d*) can include one or more respective processing apparatus (e.g., 212, 214) and one or more computer memory elements (e.g., 216, 218) that can be used together with logic implemented in software and/or hardware to implement one or more additional components of the devices (e.g., 105*a,d*). For instance, each device 105*a,d* can have a communication module (e.g., 220, 222), such as a wireless communication module (e.g., including a transmitter and receiver to send a receive wireless signals) to enable wireless communication over networks (e.g., 130) using one or more different technologies, including WiFi, Bluetooth, Near Field Communication (NFC), Z-wave, among other examples. Further, at least some devices (e.g., 105*a*) can include one or more sensors (e.g., 110*a-b*) to measure various characteristics of their environment and generate sensor data (e.g., 224) identifying values of the characteristics observed by the sensor(s). Other devices (e.g., 105*d*) can include one or more actuators (e.g., 115*b*) to perform an action or generate another output or result based on input data or a signal received at the device. In some instances, devices (e.g., 105*a,d*) can include activity logic (e.g., 225, 226) implemented in hardware and/or software of the device to permit the device to carry out one or more activities, including activities involving sensor and/or actuator resources of the device. An IoT application (e.g., 205) can leverage the functionality and sensing and actuator resources of a collection of sensor devices (e.g., 105a,d) to bring about a certain result, goal, or purpose. Interoperation of devices (e.g., 105a,d) in an application can involve the sharing of data between the devices, for instance information generated by a sensor (e.g., 110a) of one device (e.g., 105a) to be consumed by an actuator (e.g., 115b) of another device (e.g., 105d).

IoT applications (e.g., 205) utilizing one or more devices (e.g., 105a,d) can be hosted on one or more of the devices (e.g., 105a,d) and/or one or more remote server systems (e.g., 120). An IoT application (e.g., 205) can be hosted on a single device (e.g., 105a,d, 120) or can be distributed across multiple devices. In the example of FIG. 2, an IoT application 205 is hosted on application server system 120. The application server 120 can include one or more respective processing apparatus (e.g., 228) and one or more computer memory elements (e.g., 230) that can be used together with logic implemented in software and/or hardware of the server 120 to implement one or more applications and other functionality of the server. Additionally, an application server system 120 can include an interface 232 to allow the server system 120, through an application 205, to interface with one or more devices (e.g., 105a,d) to support the interoperation of the devices. An interface 232 of the application server 120 can also allow a development system to interface with the application server 120 to apply functionality of the development system (e.g., development automation engine 210) to enhance or generate code of one or more of the applications (e.g., 205) hosted by the application server.

Figure 3:
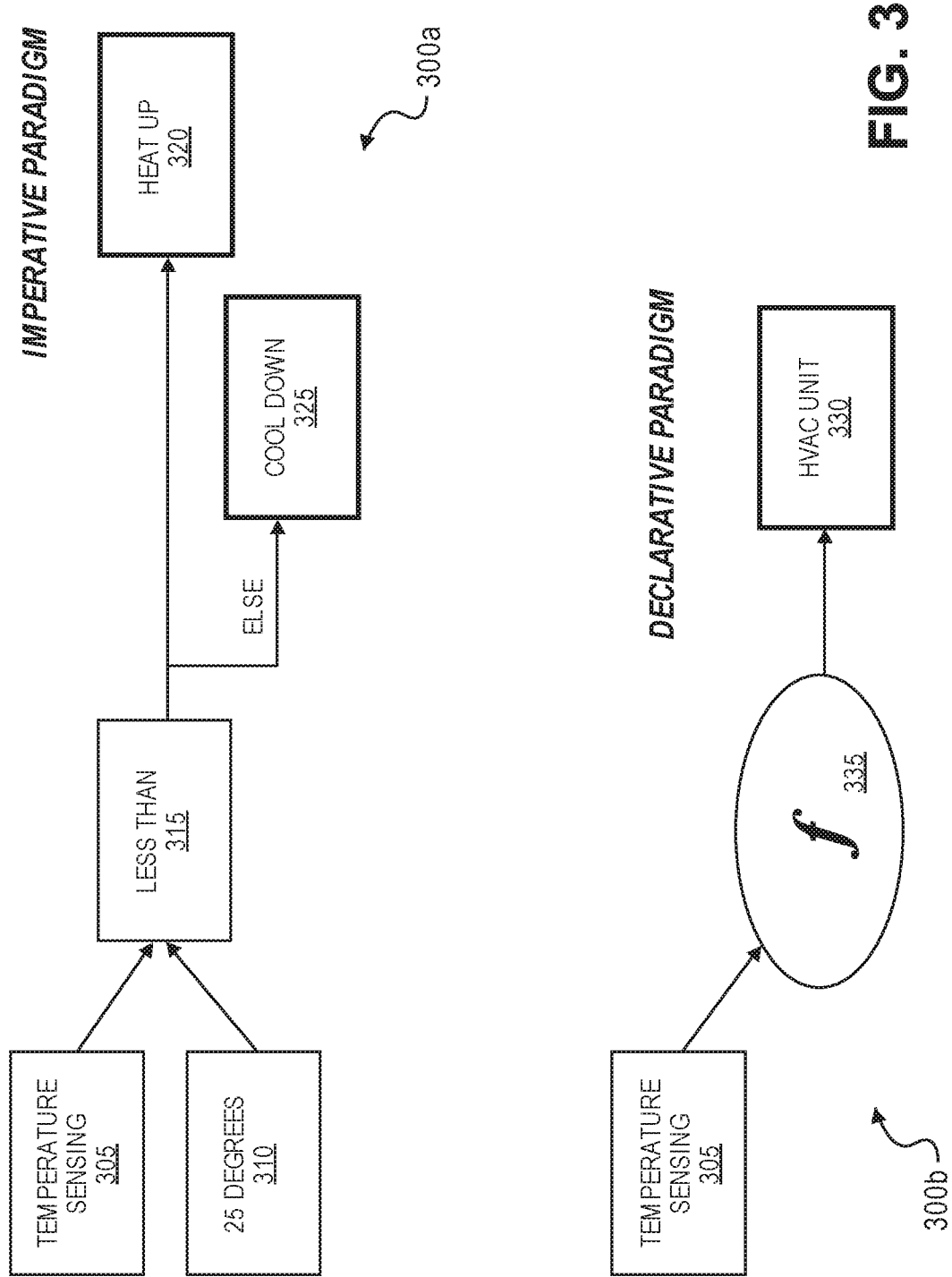
FIG. 3 illustrates a representation of imperative and declarative programming paradigms.

Turning momentarily to FIG. 3, block diagrams 300a-b represent a comparison between imperative programming and declarative programming with block diagrams 300a-b respectively representing imperative and declarative programming approaches to programming a simplified example IoT application involving an HVAC system 330, which consumes data provided by a temperature sensor 305. Imperative programming, as represented in diagram 300a, tends to encompass every detail, as is typically done in most conventional programming languages, e.g., C/C++, Java, Python, JavaScript, etc. For example, in the example of 300a, logic coded using imperative programming defines how data is transferred from the temperature sensor 305, defines constants (e.g., 310), and the algorithm 315 that is to be used to dictate how the temperature sensor data is consumed by the HVAC controller to either heat up (e.g., 320) or cool down (e.g., 325) a room using the HVAC unit. For instance, the corresponding IoT application can be coded to require that if the reading of the temperature sensor 305 is less than the defined constant 25 degrees, the HVAC controller is to cause the HVAC unit to heat up the room, and if below 25 degrees to cool it down. On the other hand, declarative thinking usually describes high-level specifications. With declarative programming (in 300b), the programming interface is simplified, with declarative programming tools asking the user to define a relationship between a temperature sensor 305 and the HVAC unit 330. Implicit in the relationship is that the temperature sensor 305 and the HVAC unit 330 be paired to provide a smart HVAC service. However, the details of "smart HVAC" may not be required to be defined by the user. Instead, the logic 335 to provide this service can be determined dynamically by the declarative programming tool using attributes of the devices (e.g., 305, 330) and by monitoring and detecting the nature of communications and data generated by each device. In some instances, while the way in which the desired service (e.g., smart HVAC service) can vary from one user to another, programming declaratively at a higher level retains the flexibility of a programming paradigm to learn the underlying details and allow the logic to adapt in runtime and to user feedback.

In one implementation, a declarative programming framework for IoT is provided through a development automation tool (e.g., 210), which can improve the expressiveness of an IoT programming paradigm while retaining the usability. Such a framework can provide users, especially laymen, the ability to easily describe high level specifications, and allows the framework to automatically learn the underlying details of the system described by the user. This can simplify the creation of IoT services by allowing users to simply specify a set of capabilities for achieving a particular application rather than their logical order, i.e., "what" rather than "how."

Returning to the example of FIG. 2, in one example, a development automation tool 210 can be provided that includes one or more respective processing apparatus (e.g., 235) and one or more computer memory elements (e.g., 236) that can be used together with logic implemented in software and/or hardware to implement one or more additional components of the development automation tool 210, such as a resource discovery module 240, resource monitor 245, declarative programming interface 248, data analytics module 250, and application generator 255, among other examples. A resource discovery module 240, in some implementations, includes functionality for detecting that a set of devices (e.g., 105a,d) are within range of each other and can potentially be used to interoperate within a proposed IoT application. For instance, in the context of IoT or wireless sensor networks (WSNs), resource discovery can allow the development automation directly, or by communicating with one or more of the devices, to discover the set of devices. For instance, one device, such as a dedicated gateway or one of the set of devices (e.g., 105a,d) can discover its surrounding devices utilizing WiFi, Bluetooth Low Energy (BLE), Z-Wave, ZigBee, and others, and communicate its findings to the development automation engine 210.

Upon discovering a set of collocated devices, resource monitor 245 can monitor the devices (e.g., 105a,d) and perform other activities to attempt to obtain information describing the attributes of the devices. For instance, the resource monitor 245 can intercept communications of each device (e.g., 105a,d) (or receive reports of the communications as intercepted by other devices (e.g., 105d,a) to determine the type of data sent and received by each device. From the monitoring, the resource monitor 245 can determine whether the device possesses one or more sensor and/or one or more actuator resources. Additionally, the resource monitor can obtain additional information upon discovering the one or more devices (e.g., 105a,d). In some cases, the intercepted communications of devices 105a,d can indicate one or more attributes of the device, from which its respective sensor and/or actuator resources can be determined. Additionally, a resource monitor 245 may query external sources for information concerning devices discovered by resource discovery module 240. For instance, one or more device information servers (e.g., 270) may be provided, which host device data 290 to indicate various attributes of classes, brands, or another collection of devices for which the device information server hosts device data 290. A resource discovery module 240, during the monitoring and detection of devices, can obtain a device identifier or another attribute from which a query to an external data source (e.g., 270) can be developed. Device information servers (e.g., 270) can field the query and return query results including additional device information usable by the development automation engine 210. In some implementations, a device information server 270 can include one or more processors (e.g., 275), one or more memory elements (e.g., 280), and one or more interfaces (e.g., 285) through which the device information server 270 can service queries from one or more instances of a development automation engine 210. A resource monitor (and/or resource discovery module 240) can utilize data from external device information servers and their own interactions with the subject devices (e.g., 105a,d) to determine the sensor and actuator resources of each device within a particular range.

The development automation engine 210 can further comprise a declarative programming interface 248 through which a user can perform declarative programming tasks. For instance, resource discovery and resource monitoring (by modules 240, 245) can be performed in response to user instructions entered using a declarative programming interface 248. In one example, through the declarative programming interface 248, users can simply declare a set of required resources without specifying their logical order. For example, when a user desires to program an IoT application to facilitate smart air conditioning, a user can identify (in some cases, through assistance of the development automation engine (e.g., using IoT application templates) that, to implement the application, devices including temperature sensing, humidity sensing and HVAC control are required. The user can select devices discovered by resource discovery module 240 and define the resources (e.g., 110a-b, 115b) as being related as a set for utilization within an IoT application, without saying how they work together (i.e., specifying the actual logic of the IoT application). From the information derived by the resource discovery module 240 and resource monitor 245, resource abstractions can be determined for each of the selected resources (before or after the user's selection of the resources), to determine whether each resource is an actuator or sensor.

A data analytics 250 module can infer the logical order or communicative relationships of the selected actuators and sensors based on the determined resource abstraction. Further, training data 260 can be accessed (e.g., as generated from the monitoring of the same or another instance of the selected sensors) along with other resource attribute information (e.g., device signal strength, orientation, relative positioning of the devices to each other) derived by the resource discovery module 240, resource monitor 245, device information server 270, or another source, to further determine (at the data analytics module 250) the nature of the potential interoperability of the resources (e.g., which actuators can or are best positioned to consume which sensor data from which sensor(s)). Operations, functions, and algorithms can be determined or inferred by the data analytics module 250 based on the training data to generate inferred logic 265 which can be utilized (e.g., by application generator 255) to generate or supplement logic of one or more IoT applications (e.g., 205). The development automation engine 210 can further utilized to dynamically refine the inferred logic 265 after application is generated and the devices being to interoperate (e.g., by monitoring operation of the devices and resources (e.g., using resource monitor 245). Further, a user can fine-tune and customize the automatically generated logic through feedback consumable by application generator 255 and/or supervised machine learning logic of the data analytics module 250, among other examples. This can allow can IoT applications/services to be customizable at runtime by users' feedback, among other features.

As noted above, a programming framework facilitating and expediting IoT service creation is described herein involving resource discovery, declarative programming, resource abstraction and data analytics. In an IoT system, resources can be generally divided into two categories—sensing and actuating. Given a defined taxonomy framework for the various resources that may be discovered, including taxonomy frameworks provided by third parties (e.g., Open Interconnect Consortium (OIC) Smart Home Spec, ZigBee Home Automation Profile, etc.), each resource can be abstracted as either a respective input X (corresponding to a sensor which generates data) or output Y (corresponding to an actuator which consumes the data). This abstraction can serve as the basis for the data analytics stage. For instance, collected device and/or training data can be used by a data analytics module (e.g., 250), within the context provided through resource abstraction, to learn and define a model indicating how a set of selected resources is likely to interact. For instance, by determining which devices X generate data and which devices Y consume the data, a supervised learning problem is established by assuming data x comes from X and the outcomes (or "labels") y come from Y. As a result, the model, the relationship between sensing and actuating, can be learned and reinforced online in real time.

Figure 4:
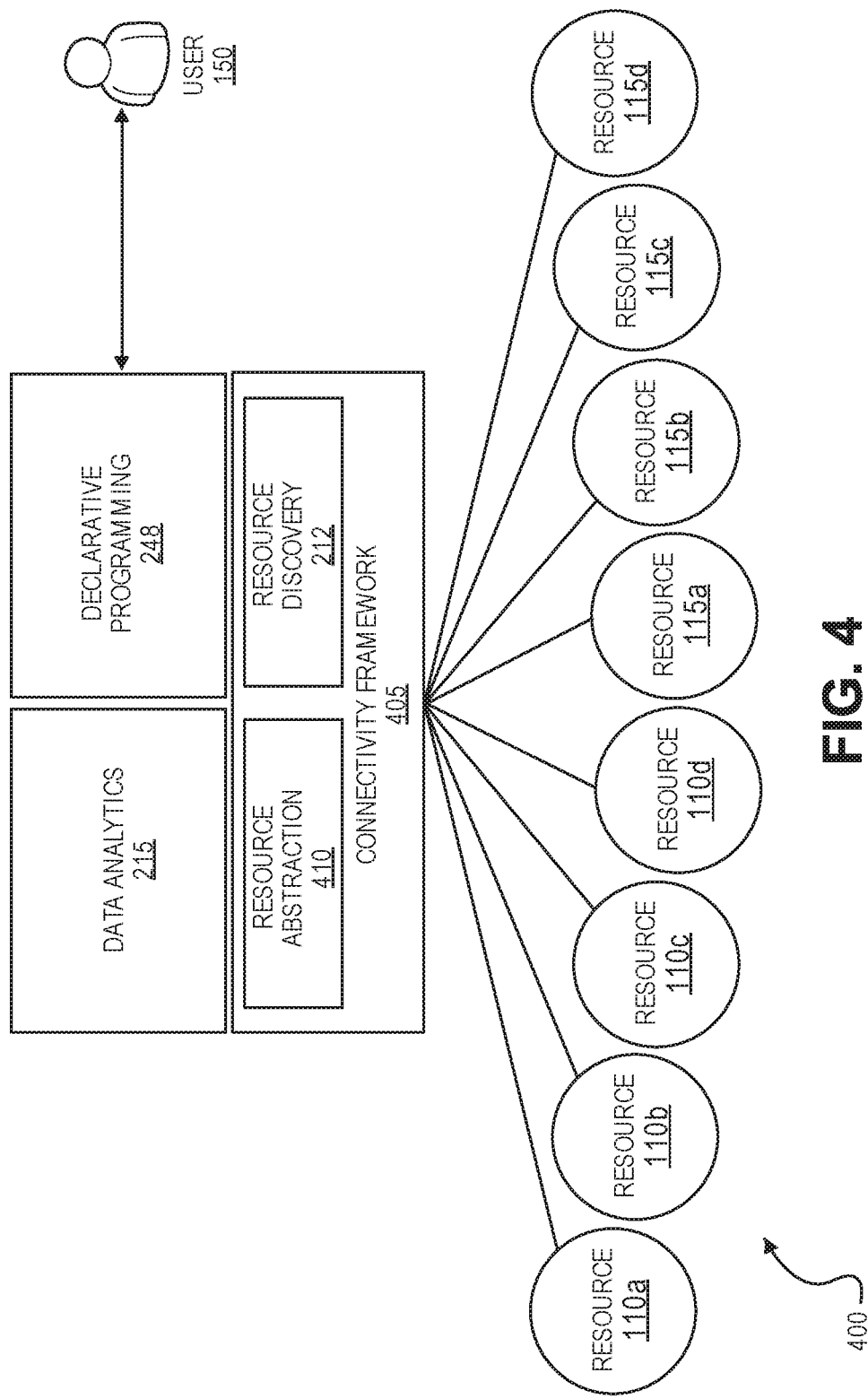
FIG. 4 illustrates a representation of an example development automation system.

Turning to FIG. 4, another simplified block diagram 400 is presented depicting a declarative IoT programming framework similar to that introduced in the examples above. For instance, in this example, the IoT programming framework can include components such as a connectivity framework 405. The connectivity framework, in one implementation, can provide the software block to support or implement a resource discovery module (e.g., 212), resource monitor (not shown), and/or other logic 410 for determining resource abstraction of each of a set of detected resources, including sensor resources (e.g., 110a-d) and actuator resources (e.g., 115a-d). In one example, connectivity framework 405 can be implemented by combining functionality using various technologies, such as OIC, ZigBee, Z-Wave, and Bluetooth, among other examples. The declarative programming interface 248 can serve as the frontend interface to users (e.g., through one or more user computing devices 150). The declarative programming interface 248 can allow users to declare a set of the resources (e.g., 110a-d, 115a-d) to be used collectively in order to achieve a particular purpose without specifying their logical order and operations. The data analytics module 215 can be provided and used to analyze the data coming from resources declared through declarative programming interface 248 by the user 150. Given that data can be collected in the background, supervised learning techniques, such as a support vector machine (SVM), a decision tree and a random forest, can be used to learn the model defining the observed relationships between inputs (from sensor resources generating the input data) and outputs (from actuator resources consuming the sensor data) based on the resource abstraction performed by resource abstraction logic 410.

Figure 5A:
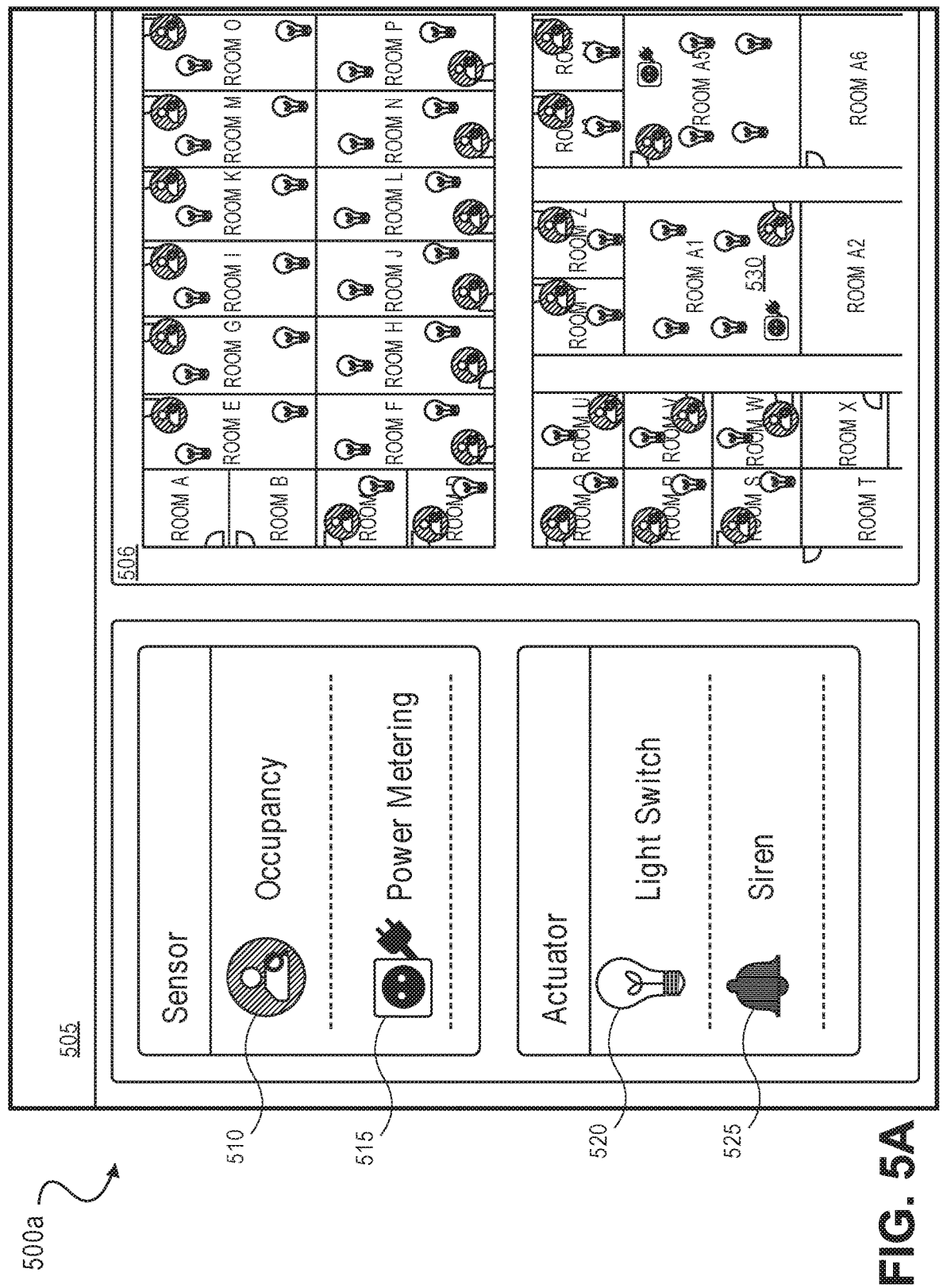
FIGS. 5A-5C illustrate example screenshots of a graphical user interface of an example development automation system.
Figure 5B:
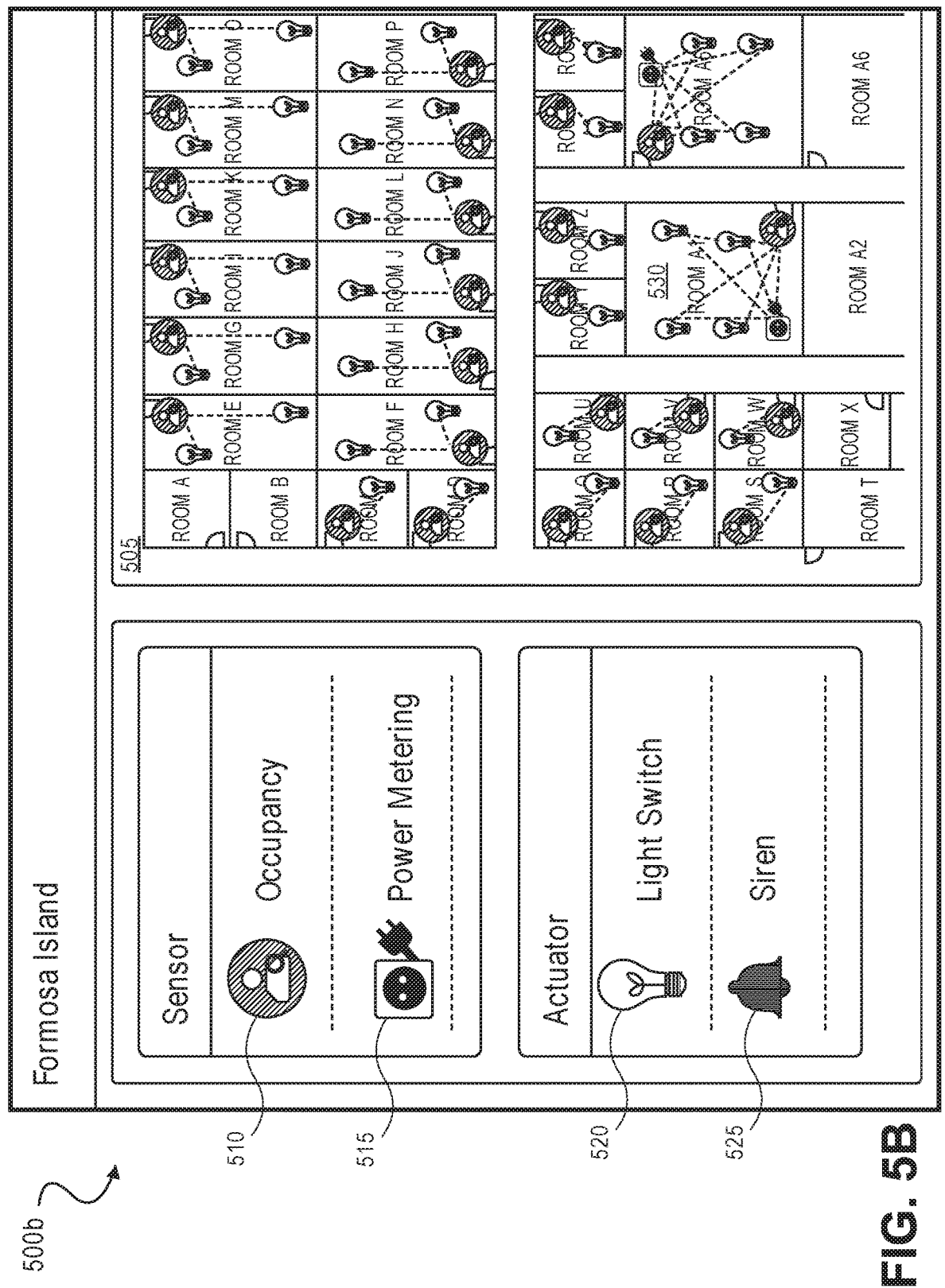
Figure 5C:
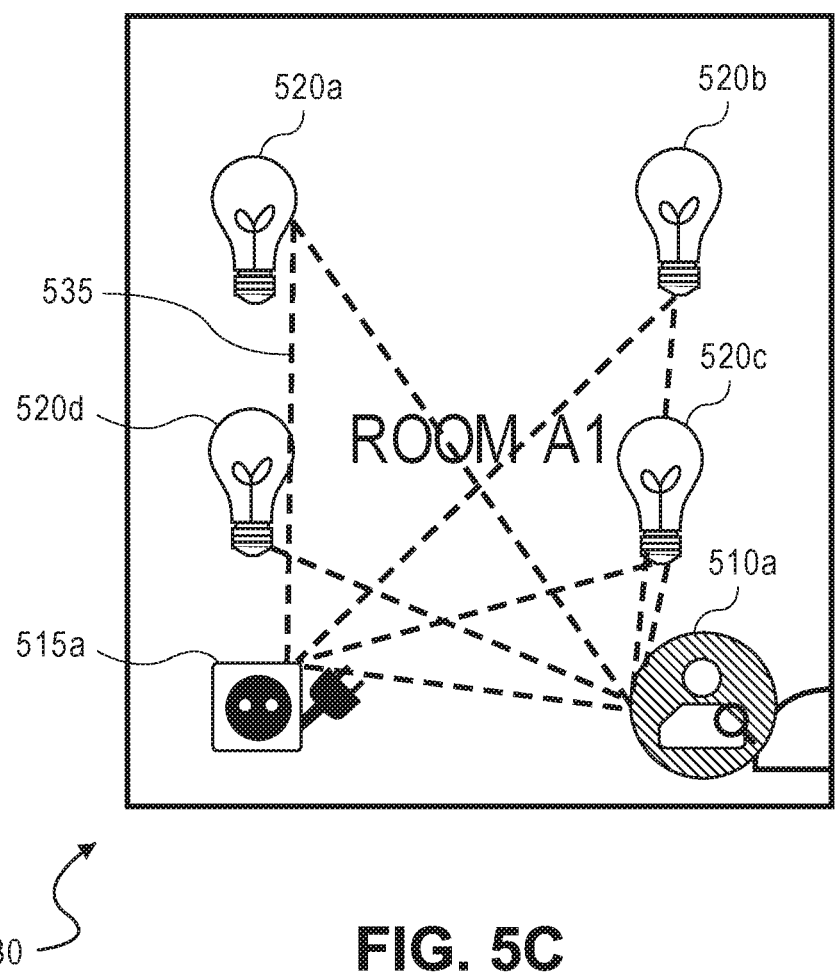

FIGS. 5A-5C show example screenshots 500a-b illustrating an example GUI of a declarative programming tool. For instance, FIG. 5A shows an example GUI window 505 allowing a user to view a number of devices detected within the floorplan of a building. For instance, sub-window 506 illustrates a floorplan of the building. Sub-window 508 illustrates a key indicating the types, and determined resource abstractions, determined for the general types of resources (e.g., 510, 515, 520, 525) discovered in the building by the declarative programming tool (e.g., as implemented in a development automation engine). For instance, in this example, occupancy sensors 510, power metering sensors 515, and automated light switch actuators 520 are deterred within the rooms of an office building, hotel, apartment, or other location. Each of the resource instances can be detected to have a respective machine access control (MAC) address, resource identifier, and location. In some implementations, the locations can be determined by one or more gateway devices used to monitor the resources. In some instances, users can edit or otherwise specify the locations of the individual resource, e.g., through drag-and-drop interactions using the example GUI. Resources can be discovered automatically using such technologies as radio protocols and protocol adaptation middleware. For example, gateway devices can be provided within an environment which can receive signals broadcast by client devices (hosting sensors and/or actuators) to indicate their presence within the environment. In one example, the signals can broadcast the resources hosted by each client device. The gateway can thereby discover the devices within the environment and report the corresponding resources to a development automation engine.

In one example, illustrated in FIGS. 5A-5C, a particular room 530 illustrated in window 506 is shown to have four light switch resources and two sensor elements—one occupancy sensor and one power metering sensor. A user can interact with any of the combinations of graphical representations of the detected resources to define relationship between the resources, as shown in FIG. 5B by the dashed graphical lines connecting graphical representations of corresponding related resources as defined by a user through the GUI.

FIG. 5C shows an exploded view of the portion of window 505 corresponding to room 530. As shown here, in this example each of the light switch actuator resource instances (520a-520d) is shown connected to each of the occupancy sensor instance 510a and power metering sensor instance 515a, based on corresponding relationships being defined by one or more users (e.g., through the GUI). For instance, dashed line 535 is shown connecting power metering sensor 515a to light switch 520a. From the defined relationships, a development automation engine may infer the data transfer relationship (e.g., from sensor to actuator) in the defined relationship. Further, the development automation engine may then obtain training data to infer one or more operations, functions, or algorithms to be utilized in the management or control of each of the related resource pairs. For instance, the development automation engine can identify the defined relationship between the light switch 520a and power sensor 515a to determine how the light switch can use data generated by the power sensor 515a to determine one or more functions for an application governing interoperation of the light switch 520a and power sensor 515a, among other relationships defined for the environment (e.g., between actuators 520a-d and sensors 510a, 515a), among other examples. As an example, in one implementation of a home automation system, based on the way users interact with their home applications, a linear repressor may determine a constant threshold of power sensor readings for determining whether or not to turn the light switch on. A support vector machine may then determine a more complicated model for controlling the light switch based on power sensor readings.

Figure 6:
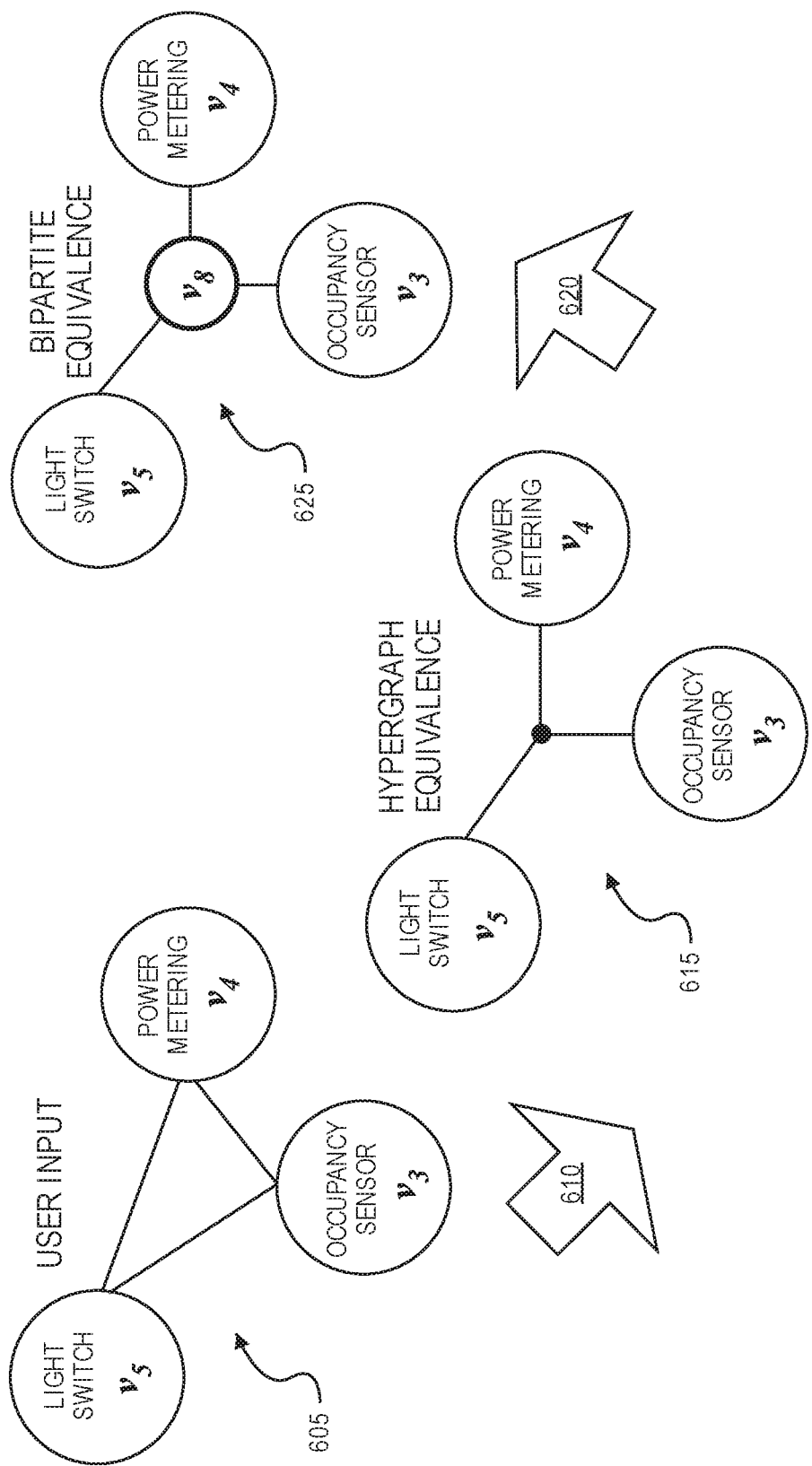
FIGS. 6-7 are simplified block diagrams illustrating an example technique for translating user input into a classification problem.

In some instances, the outcome of resource discovery is a set of resources $V=\{v_i\}_{i=1}$ where $v_i$ includes a unique identifier, e.g., MAC address, resource identifier and location. Given the set of resources V, declarative programming can provide a means to define their constraints—an edge set E such that $G=\langle V, U, E \rangle$ forms a bipartite graph where V denotes the set of resources, U denotes the constraints and E denotes the edges of the bipartite graph, as represented in FIG. 6. In one embodiment, user inputs can be provided to define pairwise constraints, or relationships, between resources V, which, in effect, forms a graph:

$$G'=\langle V, E' \rangle \text{ where } e=\{v_1,v_2\}\in E', v_1,v_2 \in V.$$

Then, the hypergraph G" can be derived by:

$$G''=\langle V, E''=C \rangle, \text{ where } C\subseteq V \text{ cliques in } G''.$$

Note that the hypergraph can also be easily generated by grouping on V since C per se is a grouping on the resources V. Finally, the bipartite equivalence can be defined by:

$$G=\langle V, U=E'', E \rangle.$$

FIG. 6 shows an illustrative example for translating 610 a graph of correlation (from user inputs) 605 into a hypergraph 615 and then converting 620 the hypergraph 615 to its bipartite equivalence 625. Resource abstraction is a means to differentiate resources from one another. It is used in the invention for differentiating between "sensing" and "actuating" resources. Let adjacent vertices of each constraint u in U be $V_u \in V$. They can be further partitioned into:

$$V_u^{sensor} \cup V_u^{actuator} = V_u$$

where $V_u^{sensor} \cup V_u^{actuator}=\phi$ and $V_u^{sensor}$ are sensors and $V_u^{actuator}$ are actuators. This will be used for the later stage of data analytics to learn the model between data of $V_u^{sensor}$ and labels of $V_u^{actuator}$.

In one embodiment, an IoT management platform can utilize resource discovery module (e.g., a ZigBee HA (home automation) plugin) where individual resource identifiers are known a priori to the resource discovery module. This can allow sensors and actuators to be easily differentiated by referencing data defining a predetermined mapping between sensor identifiers and capabilities, either sensing or actuating.

Figure 7:
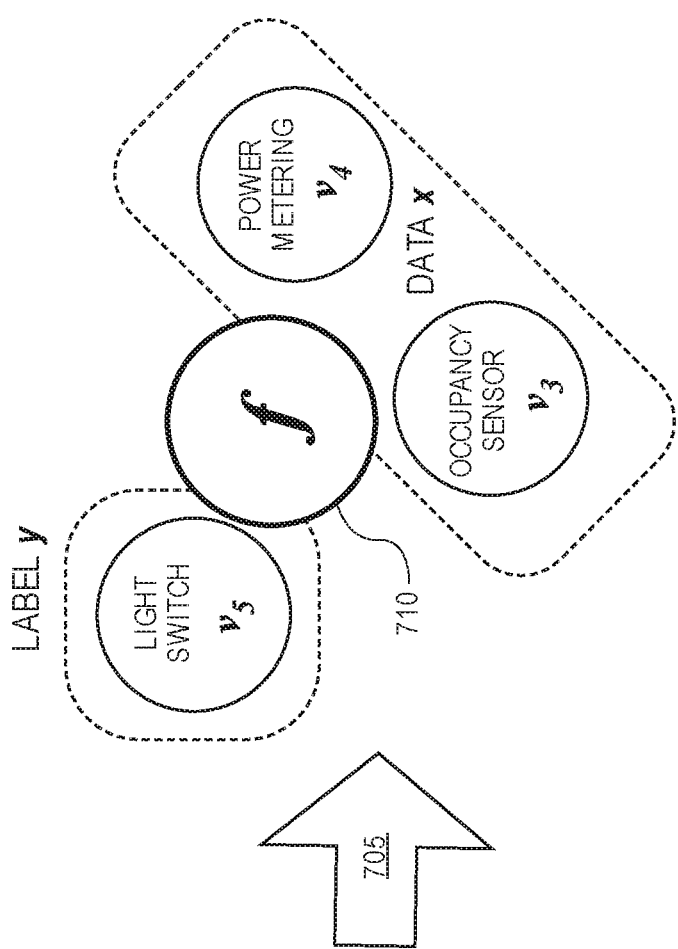
Figure 7:
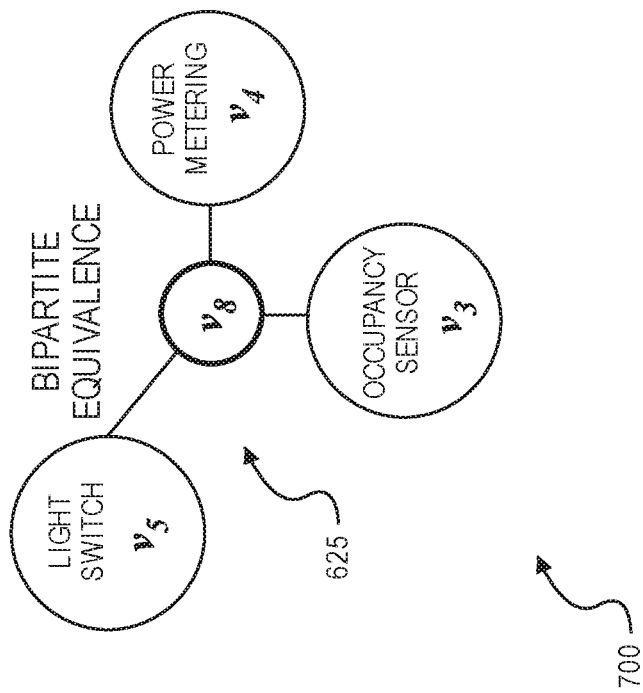

Data analytics can use machine learning to infer a function from labeled training data per the constraint u e U. The training data in some implementations may consist of a set of training examples. Each sample in the training data can be a pair consisting of an input $x=V_u^{sensor}$ and its desired output $y=V_u^{actuator}$. Inputs x and outputs y can be differentiated given the corresponding determined resource abstraction. A supervised learning algorithm, e.g., support vector machine (SVM), can analyze the training data and produce 705 an inferred function $f$ (710), as illustrated in the simplified block diagram 700 of FIG. 7. A related bipartite equivalence (e.g., 625) determined for the user-defined relationships can be utilized to determine the number of functions (e.g., 710) to be automatically generated, or inferred, by the development automation system. The inferred function $f$, can take as an input data from sensors and generate output for control of actuators. The inferred function, $f$, can be learned and utilized in the corresponding IoT application governing the relationship between the resources as defined by the user. In one embodiment, SVM can be used for deriving the inferred function from data x to labels (or outputs) y. The learning phase can be either online or offline. Further, by applying the inferred function within the IoT system, the performance of the inferred function can be observed (e.g., by the development automation engine) to determine and correct errors, inefficiencies, or other shortcomings of the originally derived inferred function(s). Indeed, the underlying models of the inferred functions can be reinforced or revised online from data collected from the implemented system. Thus, the development automation engine, utilizing machine learning, can iteratively improve the inferred function and corresponding IoT application. Indeed, in some implementations, the machine learning of the development automation engine can be supervised in that simplified user interfaces are provided to allow users to fine-tune and customize the model and function derived by the development automation engine to allow the development of the generated IoT application to iterate quickly to the desired performance level.

In accordance with the above, a system is provided for declarative programming for IoT systems and subsystems, allowing user-programmers to simply specify "what" is needed rather than "how" the components work. While many of the examples reference a smart lighting or smart HVAC application as an example, it should be appreciated that the principles discussed above apply to any potential current or future IoT system. Indeed, by simplifying the programming paradigm and corresponding tools used to program corresponding IoT applications, the promise of an expanding universe of potential device combinations and IoT systems is enhanced. For instance, programming tools, such as described above, allow users to simply specify whichever resources are correlated and allow the framework to automatically learn its underlying models. Logic of the IoT application can then be automatically generated by the programming tools and iteratively improved using supervised machine learning logic of the programming tools, among other examples.

Figure 8:
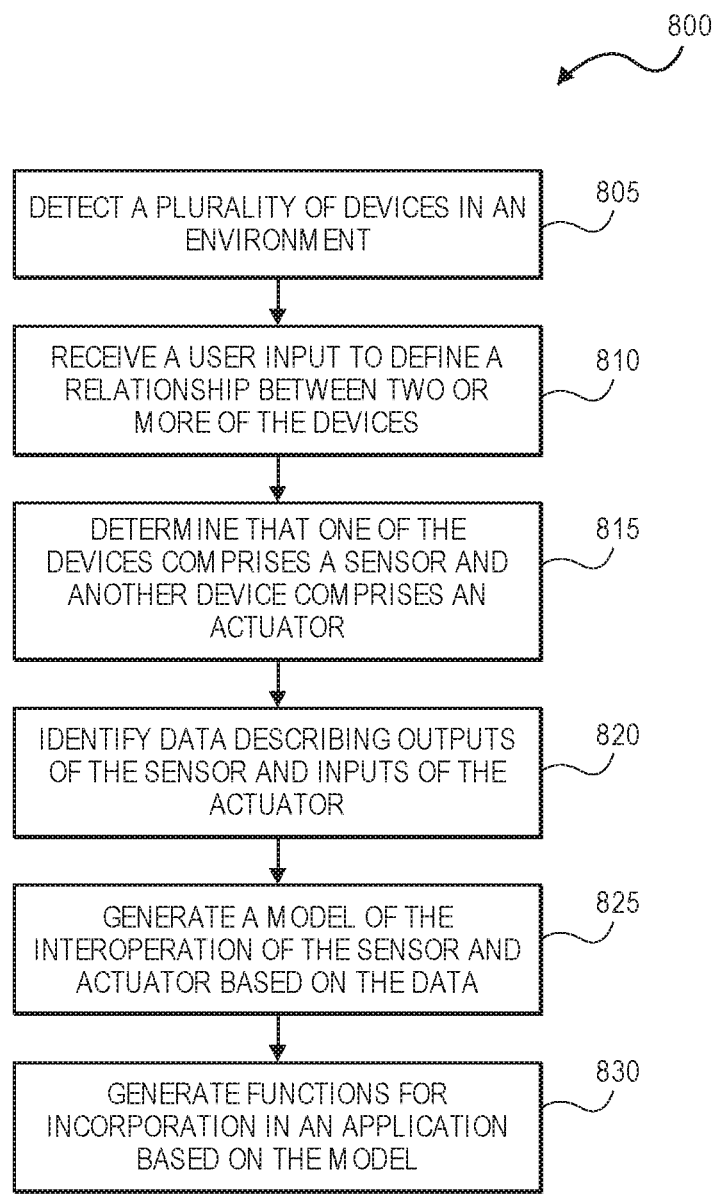
FIG. 8 is a flowchart illustrating an example technique for automating programming of an IoT/M2M system.

FIG. 8 is a simplified flowchart 800 illustrating example techniques for automating development of an IoT application for use in a system including multiple different IoT resources. For instance, multiple devices can be detected within an environment, such as by determining that the multiple devices are within range to wirelessly communicate with each other. The detection of the devices can be presented to a user and the user can provide an input (at 810) to define relationships that are to exist between two or more of the detected devices. From the user's input, a development automation engine can determine 815 whether the devices include sensor resources and/or actuator resources. Further, the development automation engine can determine at least a portion of the data transfer that is to take place between the related devices based on whether sensors or actuators are present on each device. Data can be identified 820 describing outputs of one or more sensors on a first one of the two or more devices to be input to one or more actuators on a second one of the two or more devices. The data can be training data or live data intercepted during monitoring of the two or more devices (or other instances of the two or more devices). A model can be generated 825 upon applying machine learning to the data, the model modeling the interoperation of the two or more devices. Functions and other logic can be generated 830, automatically by the development automation engine, based on the user's original definition of the relationship between the two or more device, to be incorporated in an IoT application to manage the interoperation of the two or more devices. Accordingly, a user can declaratively program at least a portion of an IoT application to govern devices in the environment.

Figure 9:
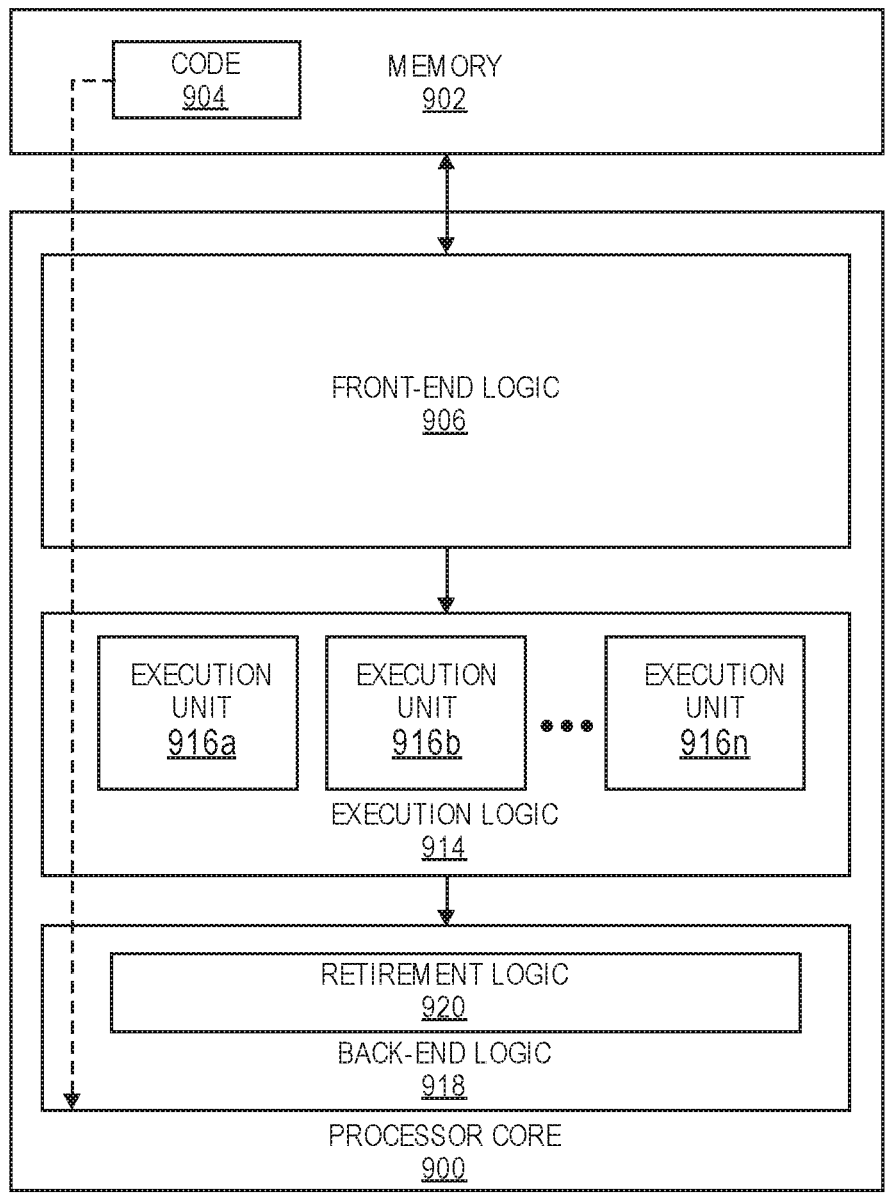
FIG. 9 is a block diagram of an exemplary processor in accordance with one embodiment.
Figure 10:
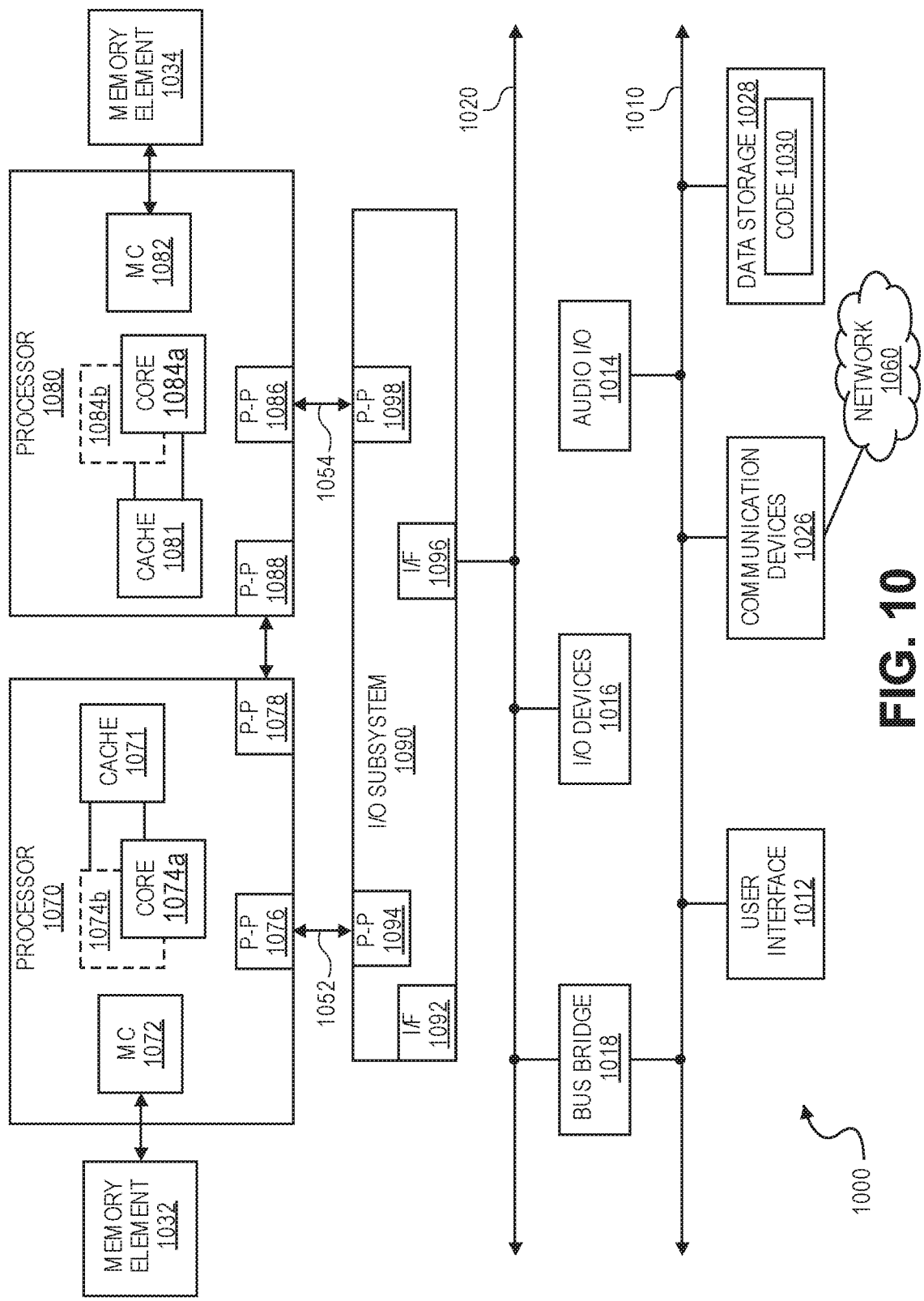
FIG. 10 is a block diagram of an exemplary computing system in accordance with one embodiment.

FIGS. 9-10 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 9-10.

FIG. 9 is an example illustration of a processor according to an embodiment. Processor 900 is an example of a type of hardware device that can be used in connection with the implementations above. Processor 900 may be any type of processor, such as a microprocessor, an embedded processor, a digital signal processor (DSP), a network processor, a multi-core processor, a single core processor, or other device to execute code. Although only one processor 900 is illustrated in FIG. 9, a processing element may alternatively include more than one of processor 900 illustrated in FIG. 9. Processor 900 may be a single-threaded core or, for at least one embodiment, the processor 900 may be multi-threaded in that it may include more than one hardware thread context (or "logical processor") per core.

FIG. 9 also illustrates a memory 902 coupled to processor 900 in accordance with an embodiment. Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 900 can execute any type of instructions associated with algorithms, processes, or operations detailed herein. Generally, processor 900 can transform an element or an article (e.g., data) from one state or thing to another state or thing.

Code 904, which may be one or more instructions to be executed by processor 900, may be stored in memory 902, or may be stored in software, hardware, firmware, or any suitable combination thereof, or in any other internal or external component, device, element, or object where appropriate and based on particular needs. In one example, processor 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor 900 can also include execution logic 914 having a set of execution units 916a, 916b, 916n, etc. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor 900 allows out of order execution but requires in order retirement of instructions. Retirement logic 920 may take a variety of known forms (e.g., re-order buffers or the like). In this manner, processor 900 is transformed during execution of code 904, at least in terms of the output generated by the decoder, hardware registers and tables utilized by register renaming logic 910, and any registers (not shown) modified by execution logic 914.

Although not shown in FIG. 9, a processing element may include other elements on a chip with processor 900. For example, a processing element may include memory control logic along with processor 900. The processing element may include I/O control logic and/or may include I/O control logic integrated with memory control logic. The processing element may also include one or more caches. In some embodiments, non-volatile memory (such as flash memory or fuses) may also be included on the chip with processor 900.

FIG. 10 illustrates a computing system 1000 that is arranged in a point-to-point (PtP) configuration according to an embodiment. In particular, FIG. 10 shows a system where processors, memory, and input/output devices are interconnected by a number of point-to-point interfaces. Generally, one or more of the computing systems described herein may be configured in the same or similar manner as computing system 1000.

Processors 1070 and 1080 may also each include integrated memory controller logic (MC) 1072 and 1082 to communicate with memory elements 1032 and 1034. In alternative embodiments, memory controller logic 1072 and 1082 may be discrete logic separate from processors 1070 and 1080. Memory elements 1032 and/or 1034 may store various data to be used by processors 1070 and 1080 in achieving operations and functionality outlined herein.

Processors 1070 and 1080 may be any type of processor, such as those discussed in connection with other figures. Processors 1070 and 1080 may exchange data via a point-to-point (PtP) interface 1050 using point-to-point interface circuits 1078 and 1088, respectively. Processors 1070 and 1080 may each exchange data with a chipset 1090 via individual point-to-point interfaces 1052 and 1054 using point-to-point interface circuits 1076, 1086, 1094, and 1098. Chipset 1090 may also exchange data with a high-performance graphics circuit 1038 via a high-performance graphics interface 1039, using an interface circuit 1092, which could be a PtP interface circuit. In alternative embodiments, any or all of the PtP links illustrated in FIG. 10 could be implemented as a multi-drop bus rather than a PtP link.

Chipset 1090 may be in communication with a bus 1020 via an interface circuit 1096. Bus 1020 may have one or more devices that communicate over it, such as a bus bridge 1018 and I/O devices 1016. Via a bus 1010, bus bridge 1018 may be in communication with other devices such as a user interface 1012 (such as a keyboard, mouse, touchscreen, or other input devices), communication devices 1026 (such as modems, network interface devices, or other types of communication devices that may communicate through a computer network 1060), audio I/O devices 1014, and/or a data storage device 1028. Data storage device 1028 may store code 1030, which may be executed by processors 1070 and/or 1080. In alternative embodiments, any portions of the bus architectures could be implemented with one or more PtP links.

The computer system depicted in FIG. 10 is a schematic illustration of an embodiment of a computing system that may be utilized to implement various embodiments discussed herein. It will be appreciated that various components of the system depicted in FIG. 10 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. One or more embodiments may provide a method, a system, apparatus, and a machine readable storage medium with stored instructions executable to detect a plurality of devices in an environment, receive a user input to define a relationship between two or more devices in the plurality of devices, determine that a first of the two or more devices includes a sensor resource and a second of the two or more devices includes an actuator resource, identify data describing outputs of the first device corresponding to the sensor resource and inputs of the second device corresponding to the actuator resource, and generate a model of interoperation of the sensor resource and actuator resource based at least in part on the data.

In one example, one or more functions can be generated based on the model for incorporation in an application to manage interoperation of the first and second devices.

In one example, a bipartite equivalence can be determined based on the defined relationship and determine a number of functions to generate based on the bipartite equivalence.

In one example, a can be determined hypergraph based on the defined relationship, and the bipartite equivalence is determined from the hypergraph.

In one example, detecting the plurality of devices includes determining that at least a particular one of the plurality devices is within range to communicate wirelessly with the other devices in the plurality of devices.

In one example, the data includes training data representing outputs of the sensor resource to be consumed by the actuator device.

In one example, the model is generated using machine learning logic.

In one example, the machine learning logic includes assisted machine learning logic configured to accept user inputs to modify the generated model.

In one example, the user input prompts automated generation of the model based at least in part on the defined relationship.

In one example, at least a portion of the application to incorporate the one or more functions.

In one example, operation of at least the portion of the application is monitored to determine an improvement to a particular one of the functions and the particular function is modified to incorporate the improvement.

In one example, user feedback data is received relating to the model and the model and at least one of the functions are modified based on the user feedback data.

In one example, attributes of the first and second devices can be determined and the model can be generated based at least in part on the determined attributes.

In one example, the attributes include at least one of an identifier of the respective device, wireless signal strength of the respective device, and position of the respective device.

In one example, determining the attributes includes querying an external data source and receiving device data in response to the query, and the device data describes at least a portion of the attributes.

One or more embodiments may provide a system including at least one processor, at least one memory element, and a development automation engine. The development automation engine can be executable by the at least one processor to detect a plurality of devices in an environment, receive a user input to define a relationship between two or more devices in the plurality of devices, determine that a first of the two or more devices includes a sensor resource and a second of the two or more devices includes an actuator resource, identify data describing inputs of the first device corresponding to the sensor resource and outputs of the second device corresponding to the actuator resource, and generate a model of interoperation of the sensor resource and actuator resource based at least in part on the data.

In one example, the system can include the plurality of devices.

In one example, the development automation engine facilitates declarative programming of an application to manage interoperation of the first and second devices based on the model.

Thus, particular embodiments of the subject matter have been described.

Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. At least one non-transitory machine accessible storage medium having instructions stored thereon, the instructions when executed on a machine, cause the machine to:
   detect a plurality of devices in an environment;
   receive a user input, wherein the user input comprises a declaratory programming statement, and the declaratory programming statement comprises a human-readable statement identifying a desired relationship between two or more devices in the plurality of devices and a desired interoperation between the two or more devices;
   determine that a first of the two or more devices comprises a sensor resource and a second of the two or more devices comprises an actuator resource;
   identify data describing outputs of the first device corresponding to the sensor resource and inputs of the second device corresponding to the actuator resource;
   determine a bipartite graph associated with the two or more devices based on the defined relationship;

determine a number of functions to generate based on the bipartite graph, wherein the number of functions comprise functions to define the interoperation between the two or more devices; and generate, using a supervised machine learning model, a model of interoperation of the sensor resource and actuator resource based at least in part on the data, wherein the model defines a corresponding inferred function for each of the number of functions.

2. The storage medium of claim 1, wherein inferred functions are for incorporation in an application to manage interoperation of the first and second devices.

3. The storage medium of claim 1, wherein the instructions, when executed, further cause the machine to determine a bipartite equivalence based on the bipartite graph, and the inferred functions are determined based on the bipartite equivalence.

4. The storage medium of claim 3, wherein the instructions, when executed, further cause the machine to determine a hypergraph based on the bipartite graph, and the bipartite equivalence is determined from the hypergraph.

5. The storage medium of claim 1, wherein detecting the plurality of devices comprises determining that at least a particular one of the plurality devices is within range to communicate wirelessly with the other devices in the plurality of devices.

6. The storage medium of claim 1, wherein the data comprises training data representing outputs of the sensor resource to be consumed by the actuator device, and the machine learning model is trained using the training data to generate the model.

7. The storage medium of claim 1, wherein the machine learning model comprise a support vector machine.

8. The storage medium of claim 1, wherein the machine learning model is to accept user inputs to modify the generated model.

9. The storage medium of claim 1, wherein the user input prompts automated generation of the model based at least in part on the defined relationship.

10. A method comprising:
detecting a plurality of devices in an environment;
receiving a user input, wherein the user input comprises a declaratory programming statement, and the declaratory programming statement comprises a human-readable statement identifying a desired relationship between two or more devices in the plurality of devices and a desired interoperation between the two or more devices;
determining that a first of the two or more devices comprises a sensor resource and a second of the two or more devices comprises an actuator resource;
identifying data describing outputs of the first device corresponding to the sensor resource and inputs of the second device corresponding to the actuator resource;
determining a bipartite graph associated with the two or more devices based on the defined relationship;
determining a number of functions to generate based on the bipartite graph, wherein the number of functions comprise functions to define the interoperation between the two or more devices; and
generating, using a supervised machine learning model, a model of interoperation of the sensor resource and actuator resource based at least in part on the data, wherein the model defines a corresponding inferred function for each of the number of functions.

11. The method of claim 10, wherein the inferred functions based on the model are for incorporation in an application to manage interoperation of the first and second devices.

12. The method of claim 11, further comprising generating at least a portion of the application to incorporate the inferred functions.

13. The method of claim 12, further comprising:
monitoring operation of at least the portion of the application to determine an improvement to a particular one of the functions; and
modifying the particular function to incorporate the improvement.

14. The method of claim 12, further comprising:
receiving user feedback data relating to the model;
modifying the model and at least one of the functions based on the user feedback data.

15. The method of claim 10, further comprising determining attributes of the first and second devices, wherein the model is generated based at least in part on the determined attributes.

16. The method of claim 15, wherein the attributes comprise at least one of an identifier of the respective device, wireless signal strength of the respective device, and position of the respective device.

17. The method of claim 15, wherein determining the attributes comprises querying an external data source and receiving device data in response to the query, and the device data describes at least a portion of the attributes.

18. A system comprising:
at least one processor;
at least one memory element; and
a development automation engine, executable by the at least one processor to:
detect a plurality of devices in an environment;
receive a user input, wherein the user input comprises a declaratory programming statement, and the declaratory programming statement comprises a human-readable statement identifying a desired relationship between two or more devices in the plurality of devices and a desired interoperation between the two or more devices;
determine that a first of the two or more devices comprises a sensor resource and a second of the two or more devices comprises an actuator resource;
identify data describing inputs of the first device corresponding to the sensor resource and outputs of the second device corresponding to the actuator resource;
determine a bipartite graph associated with the two or more devices based on the defined relationship;
determine a number of functions to generate based on the bipartite graph, wherein the number of functions comprise functions to define the interoperation between the two or more devices; and
generate, using a supervised machine learning model, a model of interoperation of the sensor resource and actuator resource based at least in part on the data, wherein the model defines a corresponding inferred function for each of the number of functions.

19. The system of claim 18, further comprising the plurality of devices.

20. The system of claim 18, wherein the development automation engine facilitates declarative programming of an application to manage interoperation of the first and second devices based on the model.

* * * * *